United States Patent Office 3,282,876
Patented Nov. 1, 1966

3,282,876
POLYMER LATICES COMPRISING ALPHA,BETA-ETHYLENICALLY UNSATURATED MONOCARBOXYLIC ACIDS AND COPOLYMERIZABLE MONOMERS
Charles R. Williams, Longmeadow, and George J. Anderson, Wilbraham, Mass., assignors to Monsanto Company, St. Louis, Mo., a corporation of Delaware
No Drawing. Filed Apr. 13, 1964, Ser. No. 359,453
11 Claims. (Cl. 260—29.6)

This invention relates to novel interpolymer latices and to a process for preparing the same.

Polymer latices are used for many applications and are becoming increasingly more useful in a variety of new and different applications. In the past few years, polymer latices have been used in floor polishes with excellent results of gloss, leveling and in particular, non-yellowing characteristics. Unfortunately, one drawback that was encountered was "polish or wax build-up" due to the inability of the latex to be removed with detergents. The latices were then compounded with alkali soluble resins in order to improve ease of removability. Unfortunately, this also resulted in a drawback in that the latices now had poor water resistance. This produced unsightly floors since "water spots" would appear on a coated floor. The polish was essentially removed by the water. Therefore, it would be extremely desirable and important to the industry to have a polymer latex which would possess the properties of excellent water resistance coupled with excellent alkaline removability with detergents or alkaline solutions. This has now been surprisingly discovered with a new and novel interpolymer latex.

It is an object of this invention to provide a novel particulate interpolymer.

Still another object of this invention is to provide a novel interpolymer latex.

Yet another object of this invention is to provide a process for preparing the novel interpolymer of this invention.

Still another object of this invention is to provide a coating composition having excellent water-resistance and excellent alkaline solution removability.

Other objects of this invention will in part be obvious and will in part be set out and appear hereinafter.

Briefly, these and other objects of this invention are attained by polymerizing an alpha,beta-ethylenically unsaturated monocarboxylic acid with an organic compound containing at least one vinylidene group. The polymerization is carried out using the emulsion polymerization process and under such conditions that the interpolymer particles so produced consist essentially of an inner core with an outer shell around the core. This shell-core configuration can best describe the interpolymer particles obtained with the polymerization process employed herein. Of necessity in the practice of this invention, the core must contain a predominant portion of the monocarboxylic acid employed herein. When the interpolymer latex is used as a floor coating composition, it has excellent removability with alkaline solutions.

The following examples are set forth to illustrate more clearly the principle and practice of this invention to those skilled in the art. Unless otherwise noted, where parts or quantities are mentioned, they are parts or quantities by weight.

EXAMPLE I

A 40% solids latex interpolymer is prepared from a monomer composition consisting of 46 weight percent of styrene, 41 weight percent of dibutyl fumarate and 13 weight percent of methacrylic acid. The interpolymer is prepared by the emulsion polymerization process wherein the reaction is carried out at a rate substantially equal to the rate at which the monomers are charged to the reaction vessel.

Kettle charge

| | Parts |
|---|---|
| Sodium dodecyl benzene sulfonate | 12 |
| Nonylphenol-ethylene oxide condensate | 6.3 |
| Water | 471 |

Monomer Charge I

| | |
|---|---|
| Styrene | 55 |
| Dibutyl fumarate | 20 |
| Methacrylic acid | 40 |

Monomer Charge II

| | |
|---|---|
| Styrene | 111 |
| Dibutyl fumarate | 131 |
| Methacrylic acid | 7 |

The kettle charge is heated to 85° C. To the kettle is then added an initiator consisting of 2 parts of sodium persulfate dissolved in 100 parts of water. The initiator is added to the kettle over the same time period as the monomer charges and simultaneously therewith.

Monomer Charge I is added to the reaction vessel at a rate substantially equal to the rate at which the monomers polymerize. The total time for addition of Monomer Charge I is about 60 minutes.

Immediately after the addition of Monomer Charge I, Monomer Charge II is added to the reaction vessel again at a rate substantially equal to the rate at which the monomers polymerize. Monomer Charge II is added over a time interval of about 120 minutes.

After completion of the addition of Monomer Charge II, the reaction mixture is heated for approximately 30 minutes to insure polymerization of essentially all of the monomers. The resulting composition is a 40% solids latex and is identified as Latex A having a particle size of 0.01–0.04 micron.

It will be specifically noted that an appreciable amount of the methacrylic acid employed in this example is added in the first monomer charge which monomer charge constitutes about 32 weight percent of the total monomers. This is to provide interpolymer particles having a core containing a predominant portion of the acid.

EXAMPLE II

Example I is repeated except that the following monomer charges are employed herein in place of Monomer Charge I and II of Example I.

Monomer Charge I

| | Parts |
|---|---|
| Styrene | 40 |
| 2-ethyl hexyl acrylate | 30 |
| Methacrylic acid | 40 |

Monomer Charge II

| | |
|---|---|
| Styrene | 154 |
| Acrylonitrile | 10 |
| 2-ethyl hexyl acrylate | 83 |
| Methacrylic acid | 7 |

This latex is designated as Latex B.

EXAMPLE III

Example I is repeated employing the same kettle charge and the same initiator except that in this example Monomer Charges I and II are premixed together and then added continuously to the kettle at a rate substantially equal to the rate at which the monomer charges polymerize. The total time for addition of the premixed single monomer charge is about 180 minutes. This latex is designated as Latex C.

It will be specifically noted that in this example there is no separation of the monomer charges as in Example I and Example II.

EXAMPLE IV

Example I is repeated except that the following kettle and monomer charges are employed in place of those used in Example I.

*Kettle charge*

| | Parts |
|---|---|
| Sodium dodecyl benzene sulfonate | 4.5 |
| Water | 485 |

*Monomer Charge I*

| | Parts |
|---|---|
| Styrene | 125 |
| Dibutyl fumarate | 89 |
| Methacrylic acid | 40 |

*Monomer Charge II*

| | Parts |
|---|---|
| Styrene | 41 |
| Dibutyl fumarate | 62 |
| Methacrylic acid | 7 |

The resulting latex is designated as Latex D.

It will be noted that in this example the first monomer charge constitutes about 70 weight percent of the total monomers and also contains a predominant portion of the acid monomer. The particle size of the latex prepared herein is 0.15–0.2 microns.

EXAMPLE V

Example IV is repeated except that in place of Monomer Charges I and II the following monomer charges are employed:

*Monomer Charge I*

| | Parts |
|---|---|
| Styrene | 154 |
| Dibutyl fumarate | 100 |

*Monomer Charge II*

| | Parts |
|---|---|
| Styrene | 33 |
| Dibutyl fumarate | 30 |
| Methacrylic acid | 47 |

The resulting latex is designated as Latex E.

It will be specifically noted that in this example all of the methacrylic acid is added in Monomer Charge II. Thus, the methacrylic acid will be contained in the outer portion or shell of the polymer particles so prepared.

EXAMPLE VI

To show the characteristics of Latex A, B, C, D and E as floor coating compositions, each latex is used to prepare a floor coating composition as follows:

| | Parts |
|---|---|
| Latex (40% solids) | 29.0 |
| Water | 59.0 |
| Ammonium hydroxide (adjust to pH of 7.0) | As needed |
| Polyethylene emulsion (24% solids) | 9.0 |
| Tributoxyethyl phosphate | 1.0 |
| Fluorocarbon (1% solids) | 0.5 |
| Monoethyl ether of diethylene glycol | 1.5 |

Each of the resulting floor coating compositions have a total solids content of about 15%, and with the exception of Latex E, they have a viscosity of less than 50 cps. The floor coating composition containing Latex E increased in viscosity to greater than 500 cps. This is unsatisfactory as a floor coating composition since it has an undesirable property of increasing in viscosity.

The coating compositions so prepared with Latex A, B, C and D are used to coat a black vinyl floor tile. As a control, a conventional floor coating composition is used to coat a black vinyl floor tile which coating has the following composition.

| | Parts |
|---|---|
| Latex (styrene-acrylate copolymer 40% solids) | 56 |
| Polyethylene emulsion (24% solids) | 21 |
| Tributoxyethyl phosphate | 2 |
| Rosin maleate (24% solids) | 21 |

The above control composition is diluted to 15% solids. Water resistance of the coated black vinyl floor tiles is tested using a Gardner Straight Line Machine. The water resistance is determined by the visual amount of coating remaining on the tile after 50 strokes with the Gardner Straight Line Machine using a sponge saturated with water. The test is run approximately 30 minutes after the coating had been applied to the floor tile. The results are as follows:

TABLE I

| Latex: | Percent coating remaining |
|---|---|
| A | 100 |
| B | 100 |
| C | 100 |
| D | 100 |
| Control | 15 |

To test the alkaline removability, black vinyl floor tile is coated with the floor coating compositions employing Latex A, B, C, D and the control coating composition. After aging the coating at 125° C. for 16 hours, the alkaline removability of the coating is tested by using the same Gardner Straight Line Machine as used previously but employing a brush saturated with a 2% potassium oleate solution. The amount of coating remaining after 20 strokes with the machine is visually determined and the results are as follows:

TABLE II

| Latex: | Percent coating removed |
|---|---|
| A | 100 |
| B | 100 |
| C | 5 |
| D | 100 |
| Control | 30 |

This example specifically shows that when the interpolymers of this invention are used in a floor coating composition to coat floor tile, the combination of water resistance and alkaline solution removability is excellent.

The instant invention is directed to a particulate interpolymer comprised of an emulsion polymerized product of an alpha,beta-ethylenically unsaturated monocarboxylic acid and an organic compound containing at least one vinylidene group $CH_2=C<$ which is interpolymerizable with the monocarboxylic acid. More specifically, the interpolymer particles of this invention can best be described as having an inner core and outer shell around the inner core. Based on a total interpolymer weight of 100 parts, the composition of the inner core can range from 20–90 parts of an interpolymer of 6–40 parts of the monocarboxylic acid with 94–60 parts of an organic compound containing at least one vinylidene group $CH_2=C<$. Correspondingly, the outer shell consists of 80–10 parts of an interpolymer of 0–3 parts of monocarboxylic acid with 100–97 parts of the remainder of an organic compound containing at least one vinylidene group. In addition, the particles have a particle size of 0.01–5.0 microns.

The critical feature of the instant invention is that the interpolymer particles have a predominant portion of the monocarboxylic acid contained in the inner core. The outer shell may contain little or no monocarboxylic acid. However, it may be desirable to have a minimum amount of the monocarboxylic acid in the shell so as to maintain freeze-thaw and mechanical stability. Preferably, in the practice of this invention, the inner core consists of 20–40 parts of an interpolymer of 8–15 parts of the monocarboxylic acid with 92–85 parts of an organic compound containing at least one vinylidene group $CH_2=C<$. Correspondingly, the shell consists of 86–60 parts of an interpolymer of 1–3 parts of the monocarboxylic acid with 99–97 parts of the remainder of an organic compound containing at least one vinylidene group. The preferred particle size is 0.01–1.0 micron and more preferably 0.01–0.3 micron.

It should be emphasized that in the practice of this invention, the core cannot consist entirely of the monocarboxylic acid. It must be an interpolymer of the monocarboxylic acid and an organic compound containing at least one vinylidene group $CH_2=C<$.

The monocarboxylic acid employed in the practice of this invention to prepare the interpolymer particles can be any of the alpha,beta-ethylenically unsaturated carboxylic acids containing a single carboxyl group. Typical examples of such preferred carboxylic acids are acrylic acid, methacrylic acid, crotonic acid, etc., and mixtures thereof. In addition, other monocarboxylic acids may be employed such as polycarboxylic acids wherein all but one of the carboxyl groups have been esterified. For example, these can include half esters of maleic acid, fumaric acid, itaconic acid, such as monomethyl maleate, monobutyl maleate, monododecyl maleate, monobutyl fumarate, etc. The preferred carboxylic acid employed in the practice of this invention is selected from the group consisting of acrylic and methacrylic acid, and mixtures thereof.

The organic compound containing at least one vinylidene group $CH_2=C<$ interpolymerized with the monocarboxylic acid can be any organic compound or mixtures thereof containing one or more vinylidene groups. Typical examples of some of the compounds containing at least one vinylidene group and which can be employed in the practice of this invention are mono- and di-olefins, e.g., ethylene, propylene, isobutylene, butadiene, isoprene, etc.; vinyl halides, e.g., vinyl chloride, vinyl bromide, etc.; vinylidene halides, e.g., vinylidene chloride esters of vinylidene monocarboxylic acids with 1–18 carbon atom monohydric alcohols e.g., methyl acrylate, methyl alpha-chloroacrylate, butyl acrylate, benzyl acrylate, dodecyl acrylate, the corresponding esters of methacrylic acid, etc.; amides and nitriles of vinylidene monocarboxylic acids, e.g., acrylamide, methacrylamide, acrylonitrile, methacrylonitrile, etc.; vinylidene aromatic hydrocarbons and nuclear alkyl and halogen derivatives thereof, e.g., styrene, vinyl naphthalene, alphamethylstyrene, vinyl toluene, 2,4-dimethylstyrene, o-, m-, p-chlorostyrene, 2,5-dichlorostyrene, 2-methyl-4-chlorostyrene, etc.; vinyl esters of 1–18 carbon monocarboxylic acids such as vinyl acetate, vinyl stearate, and vinyl benzoate, etc. Diesters of maleic acid and fumaric acid with 1–18 carbon atom monohydric alcohols can be used interchangeably therewith and typical examples thereof are diethyl maleate, dibutyl fumarate, etc. The preferred organic compound containing the vinylidene group is a mixture of styrene and dibutyl fumarate.

In the broadest aspect of the invention, the monocarboxylic acid can be polymerized with any compound containing the vinylidene group or any mixture thereof as set forth in the paragraph above. Preferably, however, the latices are prepared from monomer mixtures which will provide interpolymers having second order transition temperatures not higher than about 50° C. However, interpolymers having a higher second order transition temperature can also be employed. The selection of monomer mixtures meeting this requirement is well within the skills of the art.

The instant invention is also directed to a process for preparing the novel interpolymers of this invention. The process employed is the emulsion polymerization process wherein the various component parts are added to a reaction vessel under certain conditions. More specifically, the emulsion polymerization process employed herein, of necessity, requires that a portion of the monomers be first polymerized followed by the polymerization of the remaining portions of the monomers. In the first monomer charge, a predominant portion of the monocarboxylic acid is employed. Therefore, in the preferred practice of this invention, the first monomer charge is added to the reaction kettle at a rate substantially equal to the rate at which the monomers are polymerized. When this first monomer charge is essentially polymerized, the remaining monomer charge is then added at a rate substantially equal to the rate at which the monomers polymerize. Of course, in the emulsion polymerization process the necessary emulsion polymerization initiator and catalysts are employed.

Although the above process is considered as the preferred process, the process of this invention can be carried out by charging the total portion of the first monomer charge to the reaction vessel without continuously adding the first monomer charge at the rate at which they polymerize. The first monomer charge is then polymerized. The second monomer charge may then be added continuously as set forth in the above paragraph or all at once and then polymerized.

As shown in Example VI, the polymer latices of this invention when employed as a floor coating composition (a self-polishing floor coating), the polymer latices have excellent water resistance while having excellent removability with alkaline solutions such as detergents, soaps, household ammonia, etc. This allows for ease of removability of the floor coating while retaining its excellent resistance to water. In addition, the interpolymers of this invention have a wide variety of uses as protective or temporary coatings on surfaces to be protected against marring. For example, the interpolymer serves as an excellent protective coating on the painted surfaces of automobiles being shipped to dealers. It will protect the painted surface against scratches, dirt, marring, etc., and is not affected by rain. The coating can then easily be removed with an alkaline solution at the dealers. The protection off the surface of decorative laminates during shipping and installation thereof is another example of a surface to be protected from possible damage. In general, where any surface is to be protected or have a temporary coating, the interpolymers of this invention find wide use therein.

When employing the latices of this invention to prepare coating compositions therewith, various other ingredients and materials may be compounded with the instant latex. For example, a coating composition can consist of 25–95 weight percent on a solid basis of the latex of this invention with, correspondingly, 75–5 weight percent of a wax or an alkali soluble resin or a combination of both. The waxes that could be employed with the latex of this invention can either be natural or synthetic waxes. Some of the alkali soluble resins that can be employed with this coating composition are styrene-maleic anhydride copolymers, rosin maleates, shellac, etc. An optimum coating composition would consist of 70 weight percent of the latex of this invention, 20 weight percent of a wax and 10 weight percent of an alkali soluble resin. In addition other materials can be used with the coating composition such as plasticizers, pigments, leveling agents, emulsifiers or other ingredients that aid in film-forming properties, film texture, compatibility of the component parts and film integrity. However, it should be emphasized that the latex of this invention can be used as a coating without any additives.

It would thus be seen that the objects set forth above, among those made apparent from the description, are efficiently attained and since changes may be made in carrying out the above process and in the composition set forth without departing from the scope of this invention, it is intended that all matters contained in the above description shall be interpreted as illustrative and not in a limiting sense.

What is claimed is:

1. A particulate interpolymer comprised of an emulsion polymerized product of (A) an alpha,beta-ethylenically unsaturated monocarboxylic acid, and (B) an organic compound selected from the group consisting of aliphatic and aromatic hydrocarbons containing at least one vinylidene group, vinyl halides, vinylidene halides, esters of monocarboxylic acids containing at least one vinylidene group with 1–18 carbon atom monohydric alcohols, amides and nitriles of monocarboxylic acids, containing at least one vinylidene group, vinyl esters of 1–18 carbon monocarboxylic acids, di-esters of maleic acid and fumaric acid with 1–18 carbon atom monohydric alcohols, and mixtures thereof which is interpolymerizable with said alpha,beta-ethylenically unsaturated monocarboxylic acid, wherein the interpolymer particles based on a total interpolymer weight of 100 parts consists of (1) an inner core comprising 20–90 parts of an interpolymer of 6–40 parts of (A) with 94–60 parts of (B), and (2) an outer shell around said core comprising, correspondingly, 80–10 parts of an interpolymer of 0–3 parts of (A) with 100–97 parts of (B); said polymer particles having a particle size of 0.01–5.0 microns.

2. The composition of claim 1 wherein the interpolymer is a latex.

3. The composition of claim 1 wherein the core comprises 20–40 parts of an interpolymer of 8–15 parts of (A) with 92–85 parts of (B) and a shell comprising, correspondingly, 80–60 parts of an interpolymer of 1–3 parts of (A) with 99–97 parts of (B).

4. The composition of claim 1 wherein the particle size is 0.01–1.0 micron.

5. The composition of claim 1 wherein the particle size is 0.03–0.3 micron.

6. The composition of claim 1 wherein the alpha,beta-ethylenically unsaturated monocarboxylic acid is selected from the group consisting of acrylic acid and methacrylic acid, and mixtures thereof.

7. The composition of claim 1 wherein the organic compound containing at least one vinylidene group is a mixture of styrene and dibutyl fumarate.

8. An emulsion polymerization process for preparing an interpolymer latex which process comprises first polymerizing 20–90 parts of monomer mixture of 8–40 parts of an alpha,beta-ethylenically unsaturated monocarboxylic acid with 92–60 parts of an organic compound selected from the group consisting of aliphatic and aromatic hydrocarbons containing at least one vinylidene group, vinyl halides, vinylidene halides, esters of monocarboxylic acids containing at least one vinylidene group with 1–18 carbon atom monohydric alcohols, amides and nitriles of monocarboxylic acids containing at least one vinylidene group, vinyl esters of 1–18 carbon monocarboxylic acids, di-esters of maleic acid and fumaric acid with 1–18 carbon atom monohydric alcohols, and mixtures thereof which is interpolymerizable therewith until the polymerization is substantially completed and secondly polymerizing, correspondingly, 80–10 parts of a monomer mixture of 0–3 parts of an alpha,beta-ethylenically unsaturated monocarboxylic acid with 100–97 parts of an organic compound as described above which is interpolymerizable therewith.

9. The process of claim 8 wherein the monomers are continuously polymerized at a rate substantially equal to the rate of addition of the monomers.

10. The process of claim 8 comprising first polymerizing 20–40 parts of a monomer mixture of 8–15 parts of an alpha,beta-ethylenically unsaturated monocarboxylic acid with 92–85 parts of an organic compound as described above and secondly, polymerizing, correspondingly, 86–60 parts of a monomer mixture of 1–3 parts of an alpha,beta-ethylenically unsaturated monocarboxylic acid with 99–97 parts of an organic compound as described above.

11. The process of claim 9 wherein the alpha,beta-ethylenically unsaturated monocarboxylic acid is selected from the group consisting of acrylic acid and methacrylic acid, and mixtures thereof.

References Cited by the Examiner

UNITED STATES PATENTS 2,795,564   6/1957   Conn et al. ———— 260—29.6

MURRAY TILLMAN, *Primary Examiner.*

W. J. BRIGGS, *Assistant Examiner.*